Patented May 4, 1937

2,078,954

UNITED STATES PATENT OFFICE 2,078,954

ARTIFICIAL CORK AND METHOD OF MAKING THE SAME

Michael Levin, Baltimore, Md., assignor of four-tenths to Jacob T. Basseches, New York, N. Y.

No Drawing. Application April 27, 1927, Serial No. 187,118. Renewed November 21, 1934

12 Claims. (Cl. 106—23)

The present invention relates to improvements in a cork substitute or artificial cork, and also to a method of making such substance.

In the manufacture of artificial cork a cork base is used, such as waste cork or defective cork material reduced to granular form, the cork particles being, in the process of manufacture, first coated with a binder. The composition is then packed into molds, after which the binding material is subjected to further treatment, according to the properties thereof, so as to effect cohesion of the cork particles. In order to maintain the proper elasticity and flexibility of the cork granules, these granules have been treated heretofore with glycerine, either before the binder is mixed therewith or simultaneously with incorporating the binder therein.

Various kinds of binding materials have been employed heretofore. Some of these materials are objectionable because they impart a disagreeable odor to the cork, so that the same cannot be used as or in the manufacture of closures, when the latter are to be employed in packaging liquids or beverages for human consumption, or food stuffs in general. Other binders are objectionable because they are permeable to liquids or gases. In other cases, the binder is affected by heat and rendered to a larger extent soluble, thus making the packing useless and contaminating, on the other hand, the contents of the container. These last-mentioned binders are also objectionable because they cannot be employed in manufacturing packings in general, if the latter are to be applied to machine parts or elements which are subjected to heat. Other binding materials are set or hardened by the aid of chemicals, which act upon the contents of the bottles or other containers, to which the closures are applied, thus causing the contents to be injurious to the health of the consumer.

It has been proposed heretofore to make artificial cork with the use of rubber as a binder, and a fairly good cork composition is obtained by the use of such binding material. It is objectionable, however, mainly on the ground that the solvent for the rubber imparts to the cork an objectionable odor, and also on the ground that the resulting material loses its initial elasticity and flexibility and shrinks when subjected to dry atmosphere for a continued period. Artificial cork has been made heretofore for many years with the use of albumen as a binder, which is coagulated and rendered insoluble by heat. While an inodorous product is obtained in this manner, it is not sufficiently pliable and elastic after a certain time, and does not stand boiling to which the cork material is subjected in pasteurizing the contents of the containers after filling and closing.

The binding materials heretofore used are also objectionable because they have a tendency to decay or putrefy. For this reason these materials must be prepared from day to day and made use of immediately. Still another objection to the binding materials heretofore used is that, after they have been mixed with the cork material, the material must be dried by exposing it for a considerable time to air or to low heat, to cure the composition prior to its being packed into the molds. The result is that the manufacture of the artificial cork is greatly retarded and, on the other hand, considerable space is taken up by the material while drying.

The main object of the present invention is to provide an artificial cork which is free from all of the objections above stated.

Another object of the invention is to provide a simple process for the preparation of an artificial cork, whereby the cost of production thereof is greatly reduced, thereby resulting in a comparatively inexpensive product.

With these and other objects in view, the invention consists in the composition of matter and the method of making the same hereinafter fully described and pointed out in the appended claims, it being obvious that, while herein specific proportions of the ingredients are mentioned, innumerable changes may be made within the scope of the appended claims without departing from the spirit or sacrificing any of the advantages.

The invention consists in reducing the cork or other ligneous substance to a finely divided condition of granular form, mixing with the same a binder in liquid form, said binder being adapted to be coagulated and rendered insoluble by heat, packing the composition in its wet state, into molds, and finally subjecting the composition to heat and pressure in the molds.

The cork or other ligneous substance, such as waste cork or other waste ligneous material, or such cork which is defective and of too poor quality to be used for other purposes, is granulated by any suitable means, and subjected to treatment with a view to remove the impurities therefrom. This ground cork is then bleached, if found necessary. The ground cork is then placed, for instance, into a mechanical mixing machine and the binding material hereinafter to be described fed into the same, the ingredients being thoroughly mixed so as to coat the cork particles with the binding material.

The binding material consists of rubber or like latex, with which has been mixed a preservative agent, such as ammonia, formaldehyde, etc. By the use of the term "latex" is meant any of the milky or laticiferous saps or juices obtained from trees and plants and as are contained in rubber, gutta-percha and balata, as well as including the various combined salts, minerals and other natural substances usually found therein. Latex is understood to be an emulsion or colloidal suspension of the several solid constituents in water. While all of these latices are adapted to be used as a binder, it is preferred to use rubber-containing latex obtained from the Hevea brasiliensis, this being the tree from which most of the rubber gathered on the Amazon and its tributaries is obtained, and is also the tree which is most exclusively cultivated in Ceylon, Federated Malay States, Straits Settlements, Sumatra and other parts of the East.

Latex may be used as a binding material, either alone or it may be mixed with other substances, such as for instance egg albumen or blood albumen, or it may be mixed with casein or other materials which are generally used as glues or cements.

If latex and albumen are used as a binding material, the ingredients of the binder are, preferably, combined in the proportions stated, viz: 30 lbs. of albumen are dissolved or swelled in 45 lbs. of water, the resultant material being added to 220 lbs. of latex, and the compound thoroughly stirred and agitated to produce a homogeneous product. As above-mentioned either egg albumen or blood albumen may be used, both as found on the market as a granular product. It is preferred to use blood albumen, because it is considerably cheaper than egg albumen.

The ingredients of the artificial cork are combined, preferably, in the proportions stated, viz: To 6 lbs. of cork granules are added 3 lbs. of the binder above referred to, the ingredients being mixed as above stated until each cork particle is thoroughly coated. The material is then packed into molds, which are closed, after being filled, so as to maintain the material in the molds under pressure. The filled molds are then subjected to a temperature of 275° F. to 300° F. for about an hour, whereby the binding material is coagulated and at the same time rendered insoluble. The cork so obtained is then removed from the molds, and cut into pieces of the proper dimensions.

It is to be observed that the effect of the heat upon the mass is to render the liquid ingredients of the composition impermeable to liquids and gases, and also insoluble, the pressure serving to produce a non-porous body, the binding material filling completely the interstices between the cork or other ligneous granules. Owing to the low cost of the ingredients and the simple process, a comparatively inexpensive product is obtained, which successfully competes with natural cork, in fact it has properties which are absent in natural cork, such as elasticity and flexibility under normal conditions for any length of time. The product does not disintegrate and is not affected by boiling. It is tasteless and inodorous, and has ample elasticity and tenacity.

Actual experiments have shown that the ammonia in the latex acts on the albumen by causing it to go easily into the solution. The albumen, on the other hand, has an emulsifying action on the latex, preventing it from drying up rapidly. The binder may be prepared and left to stand for several days without putrefying or decomposing action setting in. The binder is of such nature that the cork granules mixed therewith may be packed into molds in any weather, even hot and muggy weather.

As stated above, blood albumen may be used in preparing the binding material without any objectionable or detrimental effect on containers in which food products are packed. It has been found the cheapest grade of blood albumen can be used and yet the binder will be free from the ordinary objectionable dark color of such a product, the ammoniated latex having a bleaching effect on the blood albumen.

As appears from the foregoing, the use of glycerine is eliminated in obtaining the product. Still the product has the desired characteristics of non-hardening and retains the elasticity and does not shrink. The product may be kept in boiling water for a considerable time without disintegration.

It is also possible to first mix the cork granules with albumen dissolved or swelled in water, or with a casein solution, or any other suitable glue or cement, then dry the cork and add the latex which has been preserved with any of the well known preserving agents. In these cases the cork may have been first treated with glycerine or it may be compounded in its natural state.

Instead of latex, water dispersions of rubber may be used in compounding the artificial cork.

If found necessary, to any one of the compositions above described a vulcanizing agent and an accelerator may be added, and if necessary an activator for the accelerator may be put into the compound. Sulphur may be used, for instance, as a vulcanizing agent, and zinc oxide as an activator for the accelerator. Preferably, organic accelerators are employed.

By "latex", as used in the claims, is meant the juices of plants producing rubber, gutta-percha or balata, and also water dispersions of rubber.

What I claim is:

1. An artificial cork composed of a granular cork base, and a binding material containing latex and blood albumen.

2. An artificial cork composed of a granular cork base, and a binding material containing ammoniated latex and blood albumen.

3. An artificial cork composed of a granular cork base six parts by weight, and a binding material, three parts by weight, containing latex and blood albumen.

4. An artificial cork composed of a granular cork base six parts by weight, and a binding material, three parts by weight, containing ammoniated latex and blood albumen.

5. An artificial cork composed of a granular cork base, and a binding material containing a slightly alkaline latex and blood albumen.

6. An artificial cork composed of a granular base, and a binding material containing preserved latex and blood albumen.

7. An artificial cork composed of a granular base six parts by weight, and a binding material, three parts by weight, containing preserved latex and a blood albumen.

8. An artificial cork composed of a granular base, and a binding material as recited in claim 1, together with a vulcanizing agent and an accelerator.

9. An artificial cork composed of a granular base and a binding material as recited in claim 1, together with a vulcanizing agent and an activator.

10. For use in a binder for a granular product, an adhesive comprising rubber dispersion, a vulcanizing agent, an accelerator, blood albumen and zinc oxide.

11. For use in a binder for a granular product, an adhesive comprising rubber dispersion, a vulcanizing agent, an accelerator, an aqueous dissolution product of blood albumen and zinc oxide.

12. For use as a binder for a granular product, an adhesive comprising blood albumen and formaldehyde-preserved latex.

MICHAEL LEVIN.